Patented Sept. 20, 1938

2,130,998

UNITED STATES PATENT OFFICE 2,130,998

METHOD FOR THE PREPARATION OF CELLULOSE ETHERS

Eugene J. Lorand, Wilmington, Del., assignor to Hercules Powder Company, Wilmington, Del., a corporation of Delaware No Drawing. Application May 24, 1937, Serial No. 144,540

5 Claims. (Cl. 260—152)

This invention relates to a method for the preparation of cellulose ethers.

Heretofore it has been known to prepare cellulose ethers by reacting a mixture of cellulose, alkali, water and an etherifying agent. Heretofore it has been the practice in producing cellulose ethers to rapidly heat the mixture to a high temperature and to maintain the temperature uniform throughout the reaction. Such procedure has been dictated by the fact that among other conditions high temperature accelerates the etherification reaction.

The product of the prior procedure indicated, i. e. rapidly bringing a mixture of cellulose, alkali, water and an etherifying agent up to a high temperature and maintaining the temperature throughout the reaction, has not been found entirely satisfactory in that under the conditions indicated the reaction does not proceed evenly in all the fibers of the cellulose, with the result that the product lacks uniformity. Further, such product is often found unsatisfactory for use, for example, in the formation of films in that it often gives hazy solutions in organic solvents and films prepared therefrom are not only hazy, but also show the so-called "orange peel" effect.

As an alternative procedure, it has been heretofore suggested to effect the etherification of cellulose by gradually heating a mixture of cellulose, alkali, water and an etherification agent up to reaction temperature over a period and then maintaining a reaction temperature until the reaction is complete. Such procedure has been found to be disadvantageous more particularly in that the yield of cellulose ether is unduly low (United States Patent No. 1,437,821, December 5, 1932, to See1).

Now in accordance with this invention a method for the production of cellulose ethers is provided by which a product is produced which does not have the disadvantageous characteristics of the product produced by procedure involving rapid heating and maintenance of a high temperature and, at the same time, a method by which a high yield will be obtained in comparison with the low yield obtained by the procedure involving gradual heating up to reaction temperature over a period and then maintaining the temperature to complete the reaction.

In accordance with this invention it has been found that the gradual heating to reaction temperature of a reaction mass comprising cellulose, alkali, water and an etherifying agent results in degradation of the cellulose by the alkali before any material etherification takes place, and that consequently on the reaction mass attaining a reaction temperature a low yield of cellulose ether is obtained due to the loss of cellulose by degradation during the preliminary heating period. For example, it has been found that degradation of cellulose by, for example, caustic soda, is considerable even at such moderate temperatures as 70° C.–80° C., whereas at such temperatures etherification with many etherifying agents is hardly noticeable. Further, in accordance with this invention, it has been found that the degrading effect of alkali upon cellulose is greatly reduced if the cellulose is at least partially etherified. Thus, it follows that gradual heating of a reaction mass comprising cellulose, alkali, water and an etherifying agent exposes unreacted and, therefore, unprotected cellulose fibers to the degrading effect of the alkali, with the result that some of the cellulose is destroyed before it has a chance to become etherified.

The method in accordance with the present invention comprises rapidly heating a reaction mass comprising cellulose, alkali, water and an etherifying agent to a relatively high temperature, such that the speed of etherification is high, maintaining a relatively high reaction temperature for a relatively short period and then reducing the temperature to a moderate reaction temperature at which the reaction will proceed at a moderate rate and maintaining the moderate reaction temperature for a relatively longer period to complete the reaction.

In proceeding in accordance with the method of this invention, the rapid heating of the reaction mixture to a relatively high temperature causes etherification of the cellulose fibers to proceed at a high rate so that at least partial etherification occurs rapidly and the cellulose is thus rapidly afforded protection against the degrading effect of the alkali. As a matter of fact, the rapid heating to a relatively high temperature and resultant rapid etherification affords substantial protection to the cellulose fibers against the degrading effect of the alkali before any substantial degradation of the cellulose fibers occurs. The subsequent heating at a moderate reaction temperature at which the etherification proceeds at a moderate rate, results in the production of a uniformly etherified product. At the moderate reaction temperature under which the etherification is completed, the tendency toward degradation of the cellulose by the alkali is less than at relatively high reaction temperatures and, at the same time, during the period of heating at a moderate reaction temperature, as has been indicated, the cellulose is largely protected against degradation by virtue of the fact that it is partially etherified.

The method in accordance with this invention is adaptable for the production of cellulose ethers generally by any procedure from the standpoint of detail which may be selected or desired. As will now be perceived, the essence of the invention lies in the heating rapidly to relatively high reaction temperature, which relatively high temperature is maintained for a relatively short period of time and then lowering the temperature to a moderate or relatively low reaction temperature and maintaining such temperature to completion of the reaction.

While the method in accordance with this invention is adaptable to the production of cellulose ethers generally, it will be found of especial advantage in the production of alkyl ethers such, for example, as are produced with the use of alkyl halides, as alkyl chlorides, bromides, etc. Proceeding to the practical adaptation of the method in accordance with this invention, cellulose of any suitable type and of any suitable form, as, for example, purified cotton linters, may be used. Cellulose may be used in an air dry condition or may be given any desired pretreatment. As the alkali, caustic soda as usual will be desirably used, any suitable etherifying agent, as a benzyl halide, an alkyl halide, or the like, may be used. Generally speaking, the reaction mass will include a small amount of water. If desired, the cellulose, alkali and water may be present as alkali cellulose, which may be prepared according to any known or desired method for preparing alkali cellulose. On the other hand, the cellulose, alkali, water and etherifying agent may be separately added together to form the reaction mass, i. e., without previous preparation of alkali cellulose.

If desired, an inert solvent, such as benzene, toluene, dioxan, or the like, either alone or with a small proportion of an alcohol, may be used as a diluent in the reaction mass, though generally speaking it will be desirable to avoid use of a diluent. The alkali, as indicated, will desirably be caustic soda and desirably a solid caustic of good quality containing sodium chloride as the only impurity in appreciable amount, will be used.

As has been indicated, the etherifying agent may be any suitable etherifying agent. Where alkyl ethers are to be produced, the use of akyl halides, preferably an alkyl chloride, will be used, inasmuch as the chlorides are cheaper than the bromides though the latter react more rapidly.

In proceeding more particularly for the production of alkyl ethers, and more specifically ethyl cellulose, the reaction mass comprising cellulose, alkali, an etherifying agent and water, will be first rapidly heated to a temperature of about 120° C. to about 150° C. Such temperature will be maintained for a relatively short period. Thus, for example, where the reaction mass is rapidly heated to a temperature of about 125° C. to about 135° C., such temperature will be maintained for a period of about 1 to 3 hours and such period will comprise a first stage in which the etherification of cellulose will be rapid and cellulose will be protected from degration by the alkali. In the first stage, the etherification will be rapid and as a consequence a minimum of degradation will occur despite the relatively high temperature.

On completion of the first stage, the temperature will be lowered to a moderate reaction temperature, for example, to a temperature of about 105° C. to about 120° C., preferably a temperature of about 110° C. Such temperature will then be maintained for a period which will constitute a second stage and which period will be relatively long as compared with the period constituting the first stage. Where the temperature is lowered to about 110° C. and such temperature maintained throughout the second stage, the period of the second stage will be from about six hours to about twelve hours. The first stage generally will be not more than half of the total reaction period.

In the first stage, as has been indicated, the etherification will occur at a high rate, but under the conditions etherification will not be uniform in all the fibers of the cellulose, since some parts of the fibers will react more than others. In the second stage, under the conditions existing, the difference in degree of etherification of the fibers will be eliminated. In the second stage the cellulose molecules having the lowest degree of etherification will react more readily than those having a relatively high degree of etherification, which latter will react more sluggishly. Thus, an equalization will take place resulting in a substantially uniformly etherified product.

In proceeding in accordance with the method of this invention, if desired, water generally used in the reaction mass may be replaced in whole or in part with an alcohol, as ethanol, propanol, butanol, or the like.

By way of specific illustration of practical adaptation of the method in accordance with this invention, for the production of an alkyl ether of cellulose, for example, 28 parts by weight of purified cotton linters, conditioned in air at 100% humidity, 54 parts by weight of sodium hydroxide in flakes or pellets, 16 parts by weight of ethanol and 140 parts by weight of ethyl chloride are introduced into an autoclave equipped with an agitator, or, if desired, the autoclave may be of a rotating type and if of such type may contain balls to afford adequate agitation of the reaction mass.

The autoclave having been charged, the reaction mass is rapidly heated to a temperature of about 130° C. The heating may be accomplished in any suitable or desired manner, as, for example, by introducing a heating medium into a jacket surrounding the autoclave. The temperature of 130° C. is maintained for a period of about 1½ to about 2 hours, during which period the reaction mass is subjected to agitation, either by operation of an agitator, with which the autoclave may be equipped, or by rotating the autoclave. After about 2 hours, the temperature of the reaction mass is rapidly lowered to about 110° C., which temperature is maintained substantially constant for a period of about 8 to 10 hours, after which the reaction will be complete.

The ethyl cellulose formed may be recovered by any of the well known processes. Thus, for example, by first removing from the reaction mass excess ethyl chloride and volatile by-products of the reaction by distillation, then mixing the residue with hot water with vigorous stirring. The product will be obtained in small, porous crumbs, which are washed with water to free them from salt and then dried in an oven.

The product produced in accordance with the above example will amount to about 34 parts, constituting a yield of about 98–99% of the theoretical, and will be found to contain about 49–49.5% ethoxyl.

It will be appreciated that in carrying out the method in accordance with this invention any suitable apparatus, such as indicated in connection with the above specific example, may be used, since the carrying out of the method is not dependent upon the use of any particular form of apparatus. It will further be understood that the product obtained by carrying out the method in accordance with this invention may be recovered as indicated in connection with the above specific example, or by any suitable or well known procedure.

It will be understood that the essence of the method in accordance with this invention resides in the rapid heating to a relatively high reaction temperature, then lowering the temperature to a moderate or relatively low reaction temperature and maintaining such temperature for a relatively longer period than that during which the relatively high reaction temperature is maintained.

It will be noted in the above example that I may condition linters in air at 100% humidity. I have found that the uniformity of the reaction and that of the product are greatly improved if the water introduced into the reaction mixture is uniformly distributed in the cellulose fibers through the process of a "conditioning" pre-treatment, of which the conditioning as shown above is one example. This pre-treatment has a marked effect on the subsequent alkylation reaction. Cellulose so treated is more readily and uniformly etherified than is cellulose which has not been subjected to such pre-treatment and the reaction is complete in a shorter period with resultant decreased consumption of reactants.

Incorporation of water in cellulose may be effected in various ways of which that of conditioning in air at 100% humidity is one. In general, any method to be used will involve the uniform incorporation of a controlled amount of water in the cellulosic material used, as for example, cotton linters, wood pulp, etc. The amount of water incorporated may vary from 10% to 100% by weight of the cellulose but preferably will be within the range of about 15% to about 50% by weight of the cellulose.

For example, the cellulosic material may be placed in a closed container, which is kept saturated with water vapor, until equilibrium conditions are obtained. The quantity of water absorbed depends principally upon the temperature maintained. For example, at room temperatures, cellulose will absorb about 14–16% water, while at higher temperatures higher proportions will be absorbed.

In an alternate method for the uniform incorporation of water, the cellulose fibers may be immersed in water and then pressed or centrifuged to the desired water content, which will be from about 50% to 100% by weight of the cellulose. The uniform incorporation of water according to either of these methods may be carried out at any time prior to the start of the alkylation reaction and the cellulose may be maintained almost indefinitely in such moist condition.

Still another method for the uniform incorporation of water in cellulose is the use of water-miscible, inert solvents, which serve not only to dilute the water, that is, increase its volume, but at the same time serve as reaction mediums. Such solvents are dioxan and other water-soluble polyethers and cyclic ethers as disclosed in U. S. P. 1,980,988. The amount of water which may be dissolved in dioxan, for example, may vary from about 20% to about 150% of the weight of the cellulosic material but preferably it will vary from about 40% to about 60% of the weight of the cellulose derivative. The cellulose may be treated with the mixture of water and said solvent prior to the etherification reaction and alternatively, the solvent-water medium may be introduced into the reaction vessel simultaneously with the other components of the reaction mixture.

When the cellulosic material has obtained the desired moisture content, the alkylation reaction may be carried out as more fully described above or according to any of the customary procedures used heretofore.

The following examples illustrate more specifically, methods for uniformly incorporating water in cellulosic materials. It will be understood however, that I may use other methods for uniformly incorporating water without departing from the scope of this invention.

By way of specific illustration of conditioning cellulosic materials in air at 100% humidity, 130 grams of purified cotton linters are spread out on a wire screen of non-corroding metal which is then placed in a vessel the bottom of which is covered with water. Care should be taken to avoid any direct contact between the linters and the water. After 3–4 days the linters are placed in a steam-jacketed autoclave, equipped with an anchor type agitator. Two hundred seventy grams of solid caustic soda are then added, followed by a mixture of 750 cc. benzene and 525 cc. of ethyl chloride and finally 50 cc. of water. The whole batch is then heated to 130° C. and maintained at that temperature for 16–18 hours. At the end of this time the reaction mixture is blown, as a thin stream, through a discharge valve in the bottom of the autoclave, into a 5-liter flask half filled with water which is kept boiling and vigorously agitated with a stirrer. The escaping vapors of the excess ethyl chloride, alcohol, ether and benzene are distilled off and recovered by condensation. The ethyl cellulose is formed as a fluffy flocculent precipitate which is filtered and washed with hot water until the salts are removed. The dry product has an ethoxyl content of 47% and when dissolved in solvents, as for example, ethylene chloride, a benzene-alcohol mixture, produces viscous solutions with excellent clarity free from hairs and granularity.

In another method of conditioning cellulosic materials 50 grams of purified cotton linters are immersed in 700–800 cc. of water. After 3–4 hours, the excess water is removed in a wringer, to the point where the weight of the moist linters is about 70–75 grams. This weight of moist linters is put into an autoclave, constructed similarly to that in the previous example, together with 108 grams of caustic soda and a mixture of 300 cc. benzene and 210 cc. of ethyl chloride. The reaction is carried out at 130° C. for 17–19 hours, the resulting dope being precipitated in boiling water, as above, whereby the volatile by-products are distilled off and recovered by condensation. The ethyl cellulose has properties similar to the above.

In another method of conditioning cellulosic materials 26 grams of purified cotton linters are placed in an autoclave of about 500 cc. capacity to which is added a solution of 10 cc. of water in 150 cc. of dioxan the whole being thoroughly intermixed so that the linters are evenly wetted with the liquid. Fifty-four grams of caustic soda and 105 cc. of ethyl chloride are then introduced and the autoclave is clamped in a metal frame revolving in an oil bath, the agitation of the reaction mixture being intensified by the presence of 2 or 3 metallic balls in the autoclave. After 20 hours at 130° C., the autoclave is cooled below room temperature and the contents precipitated as in the above examples, or according to any other suitable method. The ethyl cellulose, when washed free of salts and dried, has an ethoxyl content of about 49%.

It will be understood that the method in accordance with this invention is applicable to the above described procedure of alkylation and to any of the usual and well known procedures for the production of alkyl ethers of cellulose and is not limited by the examples and details hereinabove set forth.

This application is a continuation-in-part of my application, Serial No. 18,512, filed April 27, 1935, for a method for the preparation of cellulose ethers (now United States Patent No. 2,096,681).

What I claim and desire to protect by Letters Patent is:

1. The method for the preparation of alkyl ethers of cellulose which includes uniformly incorporating a controlled quantity of water in cellulose, by conditioning said cellulose in air of 100% humidity until substantial equilibrium is obtained, and then etherifying the moist cellulose by treating it at reaction temperatures with an alkyl halide and an alkali.

2. The method for the preparation of ethyl cellulose which includes uniformly incorporating a controlled quantity of water in cellulose, by conditioning said cellulose in air of 100% humidity until substantial equilibrium is obtained, and then etherifying the moist cellulose by treating it at reaction temperatures with ethyl chloride and an alkali.

3. The method for the preparation of ethyl cellulose which includes uniformly incorporating a controlled quantity of water in cellulose, by conditioning said cellulose in air of 100% humidity until substantial equilibrium is obtained, and then etherifying the moist cellulose with ethyl chloride and an alkali at a reaction temperature of about 110° C. to about 150° C.

4. The method for the preparation of alkyl ethers of cellulose which includes uniformly incorporating a controlled quantity of water in cellulose, by conditioning said cellulose in air of 100% humidity until substantial equilibrium is obtained, and then etherifying the moist cellulose by treating it at reaction temperatures with an alkyl halide and an alkali in the presence of an inert solvent selected from the group consisting of benzene, toluene and dioxan.

5. The method for the preparation of ethyl cellulose which includes uniformly incorporating a controlled quantity of water in cellulose, by conditioning said cellulose in air of 100% humidity until substantial equilibrium is obtained, and then etherifying the moist cellulose by treating it at reaction temperatures with ethyl chloride and an alkali in the presence of an inert solvent selected from the group consisting of benzene, toluene and dioxan.

EUGENE J. LORAND.